US012657390B2

(12) United States Patent
   Zhang

(10) Patent No.: US 12,657,390 B2
(45) Date of Patent: Jun. 16, 2026

(54) MACHINE LEARNING SUMMARIZATION ON NON- STRUCTURED DIGITAL CONTENT

(71) Applicant: Microsoft Technology Licensing, LLC, Redmond, WA (US)

(72) Inventor: Yu Zhang, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 213 days.

(21) Appl. No.: 18/186,120

(22) Filed: Mar. 17, 2023

(65) Prior Publication Data

US 2024/0311569 A1      Sep. 19, 2024

(51) Int. Cl.
| | |
|---|---|
| *G06F 40/30* | (2020.01) |
| *G06F 16/34* | (2019.01) |
| *G06F 40/166* | (2020.01) |
| *G06N 5/04* | (2023.01) |

(52) U.S. Cl.
CPC ............ *G06F 40/30* (2020.01); *G06F 16/345* (2019.01); *G06F 40/166* (2020.01); *G06N 5/04* (2013.01)

(58) Field of Classification Search
CPC .......... G06N 5/04; G06N 20/00; G06N 5/022; G06N 3/091; G06N 5/02; G06F 40/30; G06F 40/20; G06F 40/279; G06F 16/951; G06F 40/166; G06F 16/36; G06F 40/56; G06F 16/3344; G06F 16/345; G06F 16/9538; G06F 16/334; G06F 16/954
See application file for complete search history.

(56) References Cited

U.S. PATENT DOCUMENTS

| | | | |
|---|---|---|---|
| 9,633,005 B2 | 4/2017 | Danielyan et al. | |
| 10,235,452 B1 | 3/2019 | Savir et al. | |
| 10,346,455 B2 | 7/2019 | Sadovsky | |
| 10,460,033 B2 | 10/2019 | Cohen et al. | |
| 11,157,537 B2 * | 10/2021 | Iyer ........................ | G06F 16/335 |
| 12,475,176 B2 * | 11/2025 | Mehta ................... | G06F 16/951 |
| 2007/0073704 A1 * | 3/2007 | Bowden ................ | G06F 16/951 |
| 2012/0278300 A1 * | 11/2012 | Soubbotin ............. | G06F 16/338 |
| | | | 707/706 |
| 2016/0012131 A1 * | 1/2016 | Epstein .................. | G06Q 50/10 |
| | | | 707/706 |

(Continued)

FOREIGN PATENT DOCUMENTS

| | | | |
|---|---|---|---|
| CN | 107403375 A | 11/2017 | |
| EP | 2813984 A1 * | 12/2014 | ....... G06F 17/30817 |

OTHER PUBLICATIONS

"Summarizing Text with Artificial Intelligence", Retrieved From: https://mosaicdatascience.com/2021/05/28/summarizing-text-with-artificial-intelligence/, May 28, 2021, 7 Pages.

(Continued)

*Primary Examiner* — Michael Ortiz-Sanchez

(74) *Attorney, Agent, or Firm* — Barta Jones, PLLC

(57) ABSTRACT

A computerized method for summarizing digital content based on a query from a user is described. An inference of the query is used to identify a website that includes non-structured content. The most relevant media within the website is identified based on the inference and content from the most relevant media is extracted. Using the inference, semantic summaries are generated from the extracted content, and an aggregation of the semantic summaries are presented to the user.

20 Claims, 4 Drawing Sheets

200

(56) References Cited

U.S. PATENT DOCUMENTS

| | | | | |
|---|---|---|---|---|
| 2017/0060826 | A1* | 3/2017 | Das | G06F 16/345 |
| 2019/0114298 | A1* | 4/2019 | Acharya | G06F 40/20 |
| 2021/0089605 | A1* | 3/2021 | Xu | G06F 16/951 |
| 2023/0132072 | A1* | 4/2023 | Tunstall-Pedoe | G10L 15/26 |
| | | | | 704/9 |
| 2024/0362286 | A1* | 10/2024 | He | G06F 16/93 |

OTHER PUBLICATIONS

Adnan, et al., "An analytical study of information extraction from unstructured and multidimensional big data", In Journal of Big Data, vol. 6, Issue 91, Oct. 17, 2019, 38 Pages.

Adrian, et al., "Document Layout Analysis for Semantic Information Extraction", In Proceedings of International Conference of the Italian Association for Artificial Intelligence Bari, Nov. 14, 2017, 514 Pages.

Kouris, et al., "Text summarization based on semantic graphs: An abstract meaning representation graph-to-text deep learning approach", Retrieved from: https://assets.researchsquare.com/files/rs-1938526/v1_covered.pdf?c=1664538289, Aug. 11, 2022, 26 Pages.

Radilova, et al., "Tool for Parsing Important Data from Web Pages", In Journal of Applied Sciences, vol. 22, Nov. 24, 2022, 18 Pages.

* cited by examiner

100

MACHINE LEARNING SUMMARIZATION PLATFORM 102

EXTRACTOR ENGINE 122 ◄── CONTENT DETECTOR 120

SUMMARIZATION ENGINE 108

INFERENCE MODEL 118

COMBINED SUMMARY OF RELEVANT CONTENT 110

USER QUERY 116

USER DEVICE 104

DISPLAY INTERFACE 106

COMBINED SUMMARY OF RELEVANT CONTENT 110

USER INPUT INTERFACE 112

USER QUERY 116

USER INTERACTION DATA 114

200

202 — RECEIVE A QUERY FROM A USER

204 — BASED ON THE QUERY, SELECT A WEBSITE

206 — EXTRACT CONTENT FROM THE DIGITAL CONTENT BASED ON THE QUERY

208 — GENERATE SEMANTIC SUMMARIES OF THE EXTRACTED CONTENT

210 — AGGREGATE THE SEMANTIC SUMMARIES

212 — PROVIDE THE AGGREGATED SEMANTIC SUMMARY TO THE USER

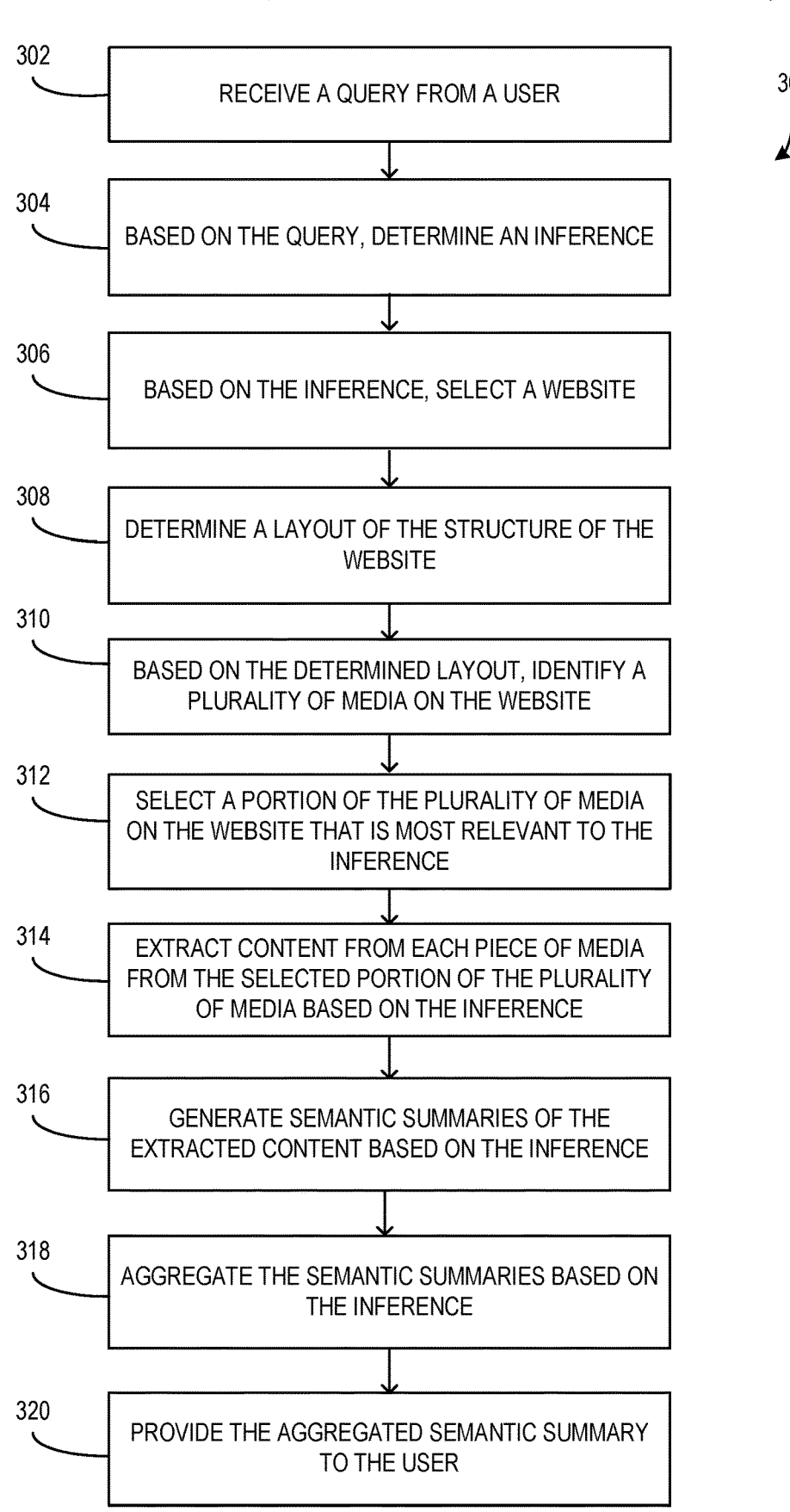

302 RECEIVE A QUERY FROM A USER

300

304 BASED ON THE QUERY, DETERMINE AN INFERENCE

306 BASED ON THE INFERENCE, SELECT A WEBSITE

308 DETERMINE A LAYOUT OF THE STRUCTURE OF THE WEBSITE

310 BASED ON THE DETERMINED LAYOUT, IDENTIFY A PLURALITY OF MEDIA ON THE WEBSITE

312 SELECT A PORTION OF THE PLURALITY OF MEDIA ON THE WEBSITE THAT IS MOST RELEVANT TO THE INFERENCE

314 EXTRACT CONTENT FROM EACH PIECE OF MEDIA FROM THE SELECTED PORTION OF THE PLURALITY OF MEDIA BASED ON THE INFERENCE

316 GENERATE SEMANTIC SUMMARIES OF THE EXTRACTED CONTENT BASED ON THE INFERENCE

318 AGGREGATE THE SEMANTIC SUMMARIES BASED ON THE INFERENCE

320 PROVIDE THE AGGREGATED SEMANTIC SUMMARY TO THE USER

FIG. 3

MACHINE LEARNING SUMMARIZATION ON NON- STRUCTURED DIGITAL CONTENT

BACKGROUND

Digital content is automatically summarized using various natural language processing (NLP) techniques. For example, extractive summarization involves identifying the most important sentences or phrases from the original text and using them to create a summary. Extractive summarization uses various criteria to identify important sentences, such as sentence length, word frequency, and sentence position. Another form of summarization is abstractive summarization. Abstractive summarization involves generating a summary that is not necessarily composed of sentences from the original text. Instead, natural language processing (NLP) techniques are used to generate new sentences that capture the essence of the original content, which requires machine learning and deep learning. Other forms of summarization use both extractive and abstractive summarization techniques by identifying important sentences or phrases from the original text and then uses NLP techniques to paraphrase and rephrase them into a coherent summary.

The accuracy of automatic sunumarization can depend on the complexity of the original text and the quality of the NLP techniques used. Generally, automatic summarization performs well with contextual conversation or well formatted content such as book; however, it does not perform well on non-structured content such as HTML pages with random layout.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example solutions for summarizing digital content include: receiving a query from a user; based on the query, selecting a website: identifying a plurality of media on the website; based at least on the query, selecting a portion of the plurality of media on the website; extracting content from each of the selected portion of the plurality of media based on the query; generating semantic summaries of the extracted content; aggregating the semantic summaries into an aggregated semantic summary; and providing the aggregated semantic summary to the user.

BRIEF DESCRIPTION OF THE DRAWINGS

The present description will be better understood from the following detailed description read considering the accompanying drawings, wherein:

FIG. 3 is a flowchart illustrating an example method for providing summarization of content from a website based on an inference from a user's query

Corresponding reference characters indicate corresponding parts throughout the drawings. In FIGS. 1 to 4, the systems are illustrated as schematic drawings. The drawings may not be to scale. Any of the figures may be combined into a single example or embodiment.

DETAILED DESCRIPTION

Aspects of the disclosure provide a system and method for using a query from a user to provide relevant summaries of digital content, such as websites. The system uses natural language processing (NLP) techniques to understand a meaning behind the user's query to determine an inference that is used throughout the process of providing the relevant summaries of the digital content. That is, the inference is used to identify the most relevant content (e.g., based on a degree of relevance to the query) within the digital content (e.g., a website), and after the identified content has been extracted, the inference is also used to generate summaries of the extracted content. The user is then presented with an aggregated summary of the generated summaries, which more accurately reflects results matching user intent from the original user query.

The disclosure operates in an unconventional manner at least by utilizing a query of a user to provide a summary of a website that includes non-structured content, for example, a plurality of media of different types and in various formats. The query of the user, and more specifically, an inference from the query, is used to determine the most relevant media, extract content therefrom, and provide the user with a summary of the extracted content. This enables users of the system to obtain summaries of digital content that more accurately reflects the request/query of the user. For example, instead of providing a summary of all of the content/media found on the website, the most relevant content is extracted from the website, summarized, summaries are aggregated, and presented to the user in a summary.

Utilizing the user's query to identify the most relevant media on a website further enables the system to extract content from the website that otherwise would be overlooked. For example, as the system extracts content from the media on the website, the system identifies links (for example, to documents, images, other websites etc.), footnotes, content in a video, to learn from the extracted content. That is, once the system identifies relevant information within the extracted content, the system dives deeper into the extractions to identify and extract additional content relevant to the user's query.

Extracting content from media that is most relevant to the user's query not only focuses the extractions, but reduces the amount of content that is extracted, thus accelerating the process toward a desirable result for the user. This, in turn, reduces the consumption of compute, memory, and/or data storage resources of associated computing systems over time, by using less, but more relevant extracted content to provide a more accurate summary of the content according to the user's query.

Figure 1:
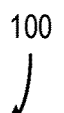
FIG. 1 is a block diagram illustrating an example system configured for providing summarization of content from a website.

FIG. 1 is a block diagram illustrating an example system 100 configured for providing a combined summary of relevant content 110 based on a request from a user. For example, a user submits a query 116 from the user input interface 112. In some examples, the query 116 includes one or more words or other search terms that are used as input to a search engine (not shown) associated with the machine learning summarization platform 102. The query 116 is received by the machine learning summarization platform 102 and inference model 118 uses techniques, such as, natural language processing (NLP) to determine an inference from the query 116. In some examples, the inference model 118 uses keyword analysis, user location, search history, tokenization, and/or semantic analysis to determine a most likely inference or intention of the user behind the query 116. In the examples described herein, either the query 116 or the determined inference results in a request for a summary of a website based at least on a particular topic. Content detector 120 utilizes the determined inference from the query 116 to identify relevant digital content, such as a website. In some examples, documents, images, or other media files are used in addition to or instead of a website In some examples, the query 116 explicitly requests the website, and in other examples, the content detector 120 identifies the website based on the determined inference without the query 116 explicitly requesting the website. Prior to identifying the most relevant content to extract from the website based on the determined inference of the query 116, the content detector 120 detects a markup layout pattern of the website. That is, most websites do not comprise a structured format. Thus, in a non-structured format, content, such as text and different types of media (e.g., a video, an image, a PDF file, a table, a link etc.) may be placed throughout the website in a non-uniform or non-structured manner. Thus, to determine which content is most relevant, the content detector 120 identifies sections of the website, such as title, subtitle, summary, highlights, menus, logos, and the like. In some examples, the content detector 120 detects markup layout patterns in the website by analyzing HTML code of the website and identifying specific HTML tags (e.g., <div>tag, <section>tag, <header>tag, <footer>tag, <nav>tag, <article>tag and the like), patterns such as indentation, a position of the tags, and recurring appearance of related content associated with tags. In some examples, the machine learning model is trained to predict specific appearance of the tags and what they represent. As such, digital content, such as an image, a PDF file, a video, and the like can be detected, recognized, and normalized to a structured layout. Based on the determined inference from the query 116, not all of the media in the website is equally important (semantically). As a result of the detected patterns of the website, the content detector 120 better understands how the page is structured and can thus identify the most relevant data more intelligently from the detected portions of the website. For example, a PDF of a product menu may be more important and more relevant (i.e., a greater degree of relevance) than a training video based on the determined inference. To determine relevancy, the content detector 120 performs NLP semantic evaluation against each portion (e.g., media+surrounding text) of the website.

Based at least on the content detector 120 identifying the most relevant media, the extractor engine 122 extracts fragments (e.g., portions of content that exceed a degree of relevancy when compared to the query and/or inference) of content from each of the detected portions that are determined the most relevant. For example, with a video, the extractor engine 122 uses the recording and extracts key phrases from the entire video. Further, by extracting key phrases from a video recording, a link, a footnote on the website, the extractor engine 122 learns from the extracted content in real time and thus can dive deeper into the extractions to identify and extract additional content relevant to the determined inference. For example, the inference may be updated in real time based on the learnings from the extracted content and the updated inference may be used to extract the additional content.

The summarization engine 108 summarizes the extracted fragments of content from each of the most relevant media. In some examples, the summarization engine 108 uses an NLP model to semantically summarize the extracted fragments of content to succinct phrases using the determined inference as a guide and as a way to apply weights to the extracted fragments of content. The summarization engine 108 aggregates each of the summaries into a combined summary of relevant content 110. In some examples, a threshold length of the combined summary of relevant content 110 is set by the user, by an administrator, or is a default setting in the summarization engine 108. In some examples, the combined summary of relevant content 110 includes different types of media, such as, an image or a portion of an image, a video or a portion of the video, a graph, a table, text, and the like. After the summarization engine 108 generates the combined summary of relevant content 110, the combined summary of relevant content 110 is provided to the user on the display interface 106. In some examples, the display interface 106 is a monitor, touchscreen, or other screen interface. Further, in some examples, the summary of relevant content 110 is displayed in such a way that the entries of the summary of relevant content 110 are ordered, such as ordered from most relevant to the determined inference of the query 116 to least relevant. Additionally, or alternatively, a user of user device 104 is enabled to select a method of ordering the entries of the summary of relevant content 110, such as changing the order to be by date, by name of an author or other creator of the media, or the like. In some examples, displaying the combined summary of relevant content 110 in the display interface 106 includes displaying the combined summary of relevant content 110 in an interface configured to continuously scroll through the combined summary of relevant content 110. In other examples, the combined summary of relevant content 110 is displayed in a paginated interface, such that each page of the combined summary of relevant content 110 includes a portion of the combined summary of relevant content 110, and a user is enabled to navigate to other pages of the combined summary of relevant content 110 instead of, or in addition to, scrolling through the currently displayed combined summary of relevant content 110.

Further, in some examples, the system 100 includes one or more computing devices (e.g., the computing apparatus of FIG. 4) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the user device 104 is a first computing device while the machine learning summarization platform 102 occupies a plurality of other computing devices. The user device 104 and/or the multiple devices of the machine learning summarization platform 102 are configured to communicate with each other via network connections as described herein. Alternatively, in other examples, the machine learning summarization platform 102 is located on and/or executed on the user device 104, such that the system 100 is located on that single device. In still other examples, other organizations of computing devices are used to implement the system 100 without departing from the description.

Further, in some examples, the machine learning summarization platform 102 suggests changes to the query 116 to improve the accuracy, relevancy, and/or efficiency of the user's request. The associated changes to the search query input to achieve such a search are provided to the user via the display interface 106, informing the user of how to improve the query 116 in the future to provide more relevant results.

Figure 2:
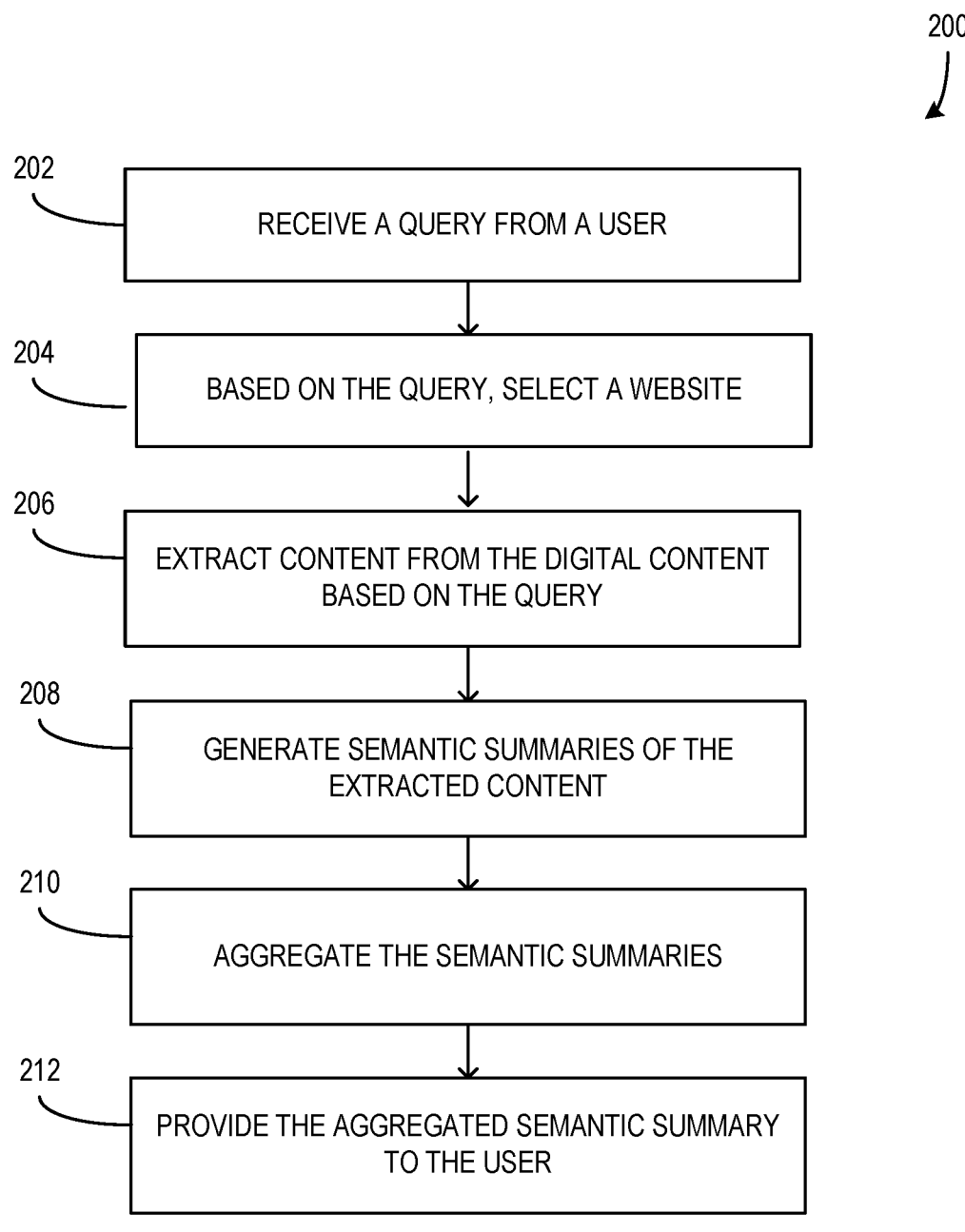
FIG. 2 is a flowchart illustrating an example method for providing summarization of content from digital content based on a user's query.

FIG. 2 is a flowchart illustrating an example method 200 for summarizing digital content (e.g., a website) based on a query from a user. In some examples, the method 200 is executed or otherwise performed by or in association with a system such as system 100 of FIG. 1.

At 202, a query from a user is received by, for example, the machine learning summarization platform 102. In some examples, the query (e.g., the query 116) includes one or more words or other search terms that are used as input to a search engine associated with the machine learning summarization platform 102.

While examples provided herein describe a user providing the query 116, in some examples, the machine learning summarization platform 102 provides the query or an updated/refined query. That is, through machine learning, the machine learning summarization platform 102 can refine the query initially submitted by a user as the machine learning summarization platform 102 identifies and extracts content from the digital content. The refining of the query may be triggered by, for example, a lack of understanding by the inference model 118 with respect to the user's request, a lack of content meeting a standard for extraction, or based on too much content meeting a standard for extraction. In each scenario, the machine learning summarization platform 102 can automatically refine the query at any point in the process or instead, start the process all over again with the refined query. In other examples, the machine learning summarization platform 102 can request that the user refine the query 116. In these examples, the machine learning summarization platform 102 can provide suggestions to the user with respect to how the query 116 can be refined.

At 204, digital content is selected by, for example, the content detector 120, based on the query 116. In some examples, the query 116 explicitly requests the digital content, and in other examples, the content detector 120 identifies the digital content based on the query without the query 116 explicitly requesting the digital content.

After the digital has been selected by the content detector 120, at 206, content from a plurality of media on the website the is most relevant to the query is extracted therefrom. That is, rather than extracting content from all media in the digital content, the content detector 120 uses the query 116 to determine which media from the digital content is the most relevant to the query 116. In some examples, the content detector 120 determines the most relevant content by performing NLP semantic evaluation against each block of the media, wherein each block comprises at least a portion of the media and surrounding text. Thus, unlike conventional extraction processes which extract content from either all identified media in the digital content or from media that may not be relevant to the query 116, the extractor engine 122 applies a focused extraction of content by extracting fragments of content from most relevant media without extracting content from media that is determined to be not relevant. By focusing the extraction of content on content that is the most relevant to the query 116, the extractor engine 122 extracts content that would otherwise be overlooked in conventional methods.

At 208, semantic summaries of the extracted content are generated by, for example, the summarization engine 108. In some examples, an NLP model is used to semantically summarize the extracted fragments of content to succinct sentences using the inference of the query 116 as a guide and as a way to apply weights to the extracted fragments of content for aggregation. In some examples, succinct sentences do not exceed a threshold number of words. At 210, the semantic summaries are aggregated by, for example, the summarization engine 108 into an aggregated semantic summary or a combined summary of relevant content 110. In some examples, a length of the combined summary of relevant content 110 is set by the user, by an administrator, or is a default setting in the summarization engine 108. The aggregated semantic summary may comprise a threshold number of succinct sentences (e.g., 5, 10, or 15 sentences etc.) that do not exceed a threshold number of words (e.g., 50, 100, or 200 etc.). In some examples, the combined summary of relevant content 110 includes different types of media, such as, an image or a portion of an image, a video or a portion of the video, a graph, a table, text, and the like.

At 212, the aggregated semantic summaries are provided to the user on, for example, the display interface 106. In some examples, the display interface 106 is a monitor, touchscreen, or other screen interface. Further, in some examples, the summary of relevant content 110 is displayed in such a way that the entries of the summary of relevant content 110 are ordered, such as ordered from most relevant to the query 116 to least relevant. For example, if a query from a user is "Find a burger place serving healthy food near me." The aggregated summary may include results in order of a degree of relevancy when compared to the query. For example, the results may include a link to a particular restaurant, a list of recommended daily consumption with the number of calories, a menu or a list of burgers with total calories within the daily limit in order from low amount of calories to a high amount of calories, customer review that is specifically related to a healthy burger or other food from the burger place, and an add for the restaurant related to the restaurant related to how it produces healthy food. As such, the aggregated summary includes fragments from the most relevant portions of media identified in the website listed in an order based on their degree of relevancy. In another example, the aggregated summary is in paragraph form (instead of a list), wherein each of the semantic summaries are combined by the summarization engine 108 in such a way that their is unity and coherence of ideas among sentences.

With reference now to FIG. 3, a flowchart illustrating an exemplary method for providing summarization of content from a website based on an inference from a user's query is described. At 302, a query from a user is received by, for example, the machine learning summarization platform 102. At 304, the inference model 118 determines an inference of the query 116 by, for example, using NLP techniques. For example, the inference model 118 may use keyword analysis, user location, search history, tokenization, and/or semantic analysis to determine a most likely inference or meaning (or intention of the user) behind the query 116. In the examples described herein, either the query 116 or the determined inference results in a request for a summary of a website based at least on a particular topic identified from the query 116.

While examples provided herein describe a user providing the query 116, in some examples, the machine learning summarization platform 102 provides the query or an updated/refined query. That is, through machine learning, the machine learning summarization platform 102 can refine the query initially submitted by a user as the machine learning summarization platform 102, updates the inference from the refined query, and identifies and extracts content from one or more websites based on the updated inference. The refining of the query may be triggered by, for example, a lack of understanding by the inference model 118 with respect to the user's request, a lack of content meeting a standard for extraction, or based on too much content meeting a standard for extraction. In each scenario, the machine learning summarization platform 102 can automatically refine the query at any point in the process or instead, start the process all over again with the refined query and enabling the inference model 118 to determine a new or updated inference from the refined query. In other examples, the machine learning summarization platform 102 can request that the user refine the query 116. In these examples, the machine learning summarization platform 102 can provide suggestions to the user with respect to how the query 116 can be refined.

At 306, a website is selected by, for example, the content detector 120, based on the inference of the query 116. In some examples, the query 116 explicitly requests the website and the inference is not used to select the website. In other examples, the content detector 120 identifies the website based on the determined inference without the query 116 explicitly requesting the website.

At 308, a layout of the structure of the website is determined. That is, after the website has been selected by the content detector 120, the content detector 120 detects a markup layout pattern of the website as it may not be known whether the website is in a structured format or a non-structured format. Content, such as text and different types of media (e.g., a video, an image, a PDF file, a table, a link etc.) are likely placed throughout the website in a non-uniform or non-structured manner. Thus, prior to determining which content is most relevant from the website, the content detector 120 identifies sections of the website, such as title, subtitle, summary, highlights, menus, logos, and the like. In some examples, the content detector 120 detects markup layout patterns in the website by analyzing HTML code of the website and identifying specific HTML tags, patterns such as indentation, positions of the tags, and recurring appearance of related content associated with tags. In some examples, the machine learning model is trained to predict specific appearance of the tags and what they represent. As such, digital content, such as an image, a PDF file, a video, and the like within the website can be detected, recognized, and normalized to a structured layout. As a result of the detected patterns of the website, at 310, a plurality of media on the website is identified as the content detector 120 better understands how the website is structured and can thus identify the most relevant data more intelligently from the detected sections of the website. That is, rather than identifying all media on the website to be used to extract content therefrom, the content detector 120 uses the inference from the query 116 to determine which media from the website is the most relevant to the inference of the query 116. For example, a PDF of a product menu may be more important and more relevant (i.e., have a higher degree of relevance) than a training video based on the determined inference. In some example, to determine relevancy, the content detector 120 performs NLP semantic evaluation against each portion (e.g., media+surrounding text) of the website. At 312, a portion of the plurality of media on the website is selected based at least on their degree of relevance to the inference.

At 314, content from each piece of the media from the selected portion of the plurality of media is extracted based on the inference. That is, based at least on the content detector 120 identifying the most relevant media from the website, the extractor engine 122 extracts content (e.g., fragments of the most relevant content) from each media within the selected portion of the plurality of media. In some examples, the content detector 120 determines the most relevant content by performing NLP semantic evaluation against each block of media, wherein each block comprises at least a portion the media and surrounding text, extracts the fragment of content from each block, compares the fragment of content to the query (and more specifically, the inference), and based at least on the comparing, determines the most relevant media. Thus, unlike conventional extraction processes which extract content from either all identified media in the website or from media that may not be relevant to the query 116, the extractor engine 122 applies a focused extraction of content by extracting fragments of content from most relevant media without extracting content from media that is determined to be not relevant. Further, the fragments of content being extracted from the selected portion of the plurality of media are also based on the query 116, and more specifically, the inference. Thus, not only is the portion of the plurality of media selected based on the inference, but the content being extracted from the portion of the plurality of media is also based on the inference. By focusing the extraction of content on content that is the most relevant to the inference, the extractor engine 122 extracts content that would otherwise be overlooked in conventional methods. That is, the extractor engine 122 may extract fragments of content from a link or a footnote that would otherwise be overlooked as the link or the footnote in the website includes information that is relevant to the inference. Still further, the extractor engine 122 learns from the extracted content in real time and thus can dive deeper into the extractions to identify and extract additional content relevant to the determined inference. For example, a link in the website may be a link to a PDF document. Thus, by extracting content from the link, the extractor engine accesses the PDF document from the link and extracts additional fragments of content from the PDF associated with the link.

At 316, semantic summaries of the extracted content are generated by, for example, the summarization engine 108. In some examples, an NLP model is used to semantically summarize the extracted fragments of content to succinct sentences using the inference of the query 116 as a guide and as a way to apply weights to the extracted fragments of content for aggregation. In some examples, succinct sentences do not exceed a threshold number of words. At 318, the semantic summaries are aggregated by, for example, the summarization engine 108 into a combined summary of relevant content 110. In some examples, a length of the combined summary of relevant content 110 is set by the user, by an administrator, or is a default setting in the summarization engine 108. The aggregated semantic summary may comprise a threshold number of succinct sentences that do not exceed a threshold number of words. In some examples, the combined summary of relevant content 110 includes different types of media, such as, an image or a portion of an image, a video or a portion of the video, a graph, a table, text, and the like.

At 320, the aggregated semantic summary is provided to the user on, for example, the display interface 106. In some examples, the display interface 106 is a monitor, touchscreen, or other screen interface. Further, in some examples, the summary of relevant content 110 is displayed in such a way that the entries of the summary of relevant content 110 are ordered, such as ordered from most relevant to the determined inference of the query 116 to least relevant. In some examples, displaying the combined summary of relevant content 110 in the display interface 106 includes displaying the combined summary of relevant content 110 in an interface configured to continuously scroll through the combined summary of relevant content 110. In other examples, the combined summary of relevant content 110 is displayed in a paginated interface, such that each page of the combined summary of relevant content 110 includes a portion of the combined summary of relevant content 110, and a user is enabled to navigate to other pages of the combined summary of relevant content 110, or in addition to, scrolling through the currently displayed search result entries.

Additionally, or alternatively, to the rules prompt being provided, in some examples, a suggested query prompt is provided including information indicating one or more changes that could be made to the search query input to improve a likelihood that the search result content includes an entry for which the user is searching. In such examples, the suggested changes to the search query input are determined based on the generated result filter rules. For instance, if a result filter rule indicates that entries of a certain type should be filtered out of the search result content, an associated suggested change to the search query input includes a suggestion to include a search term that eliminates entries of that type from the potential search result content. In other examples, suggested changes are determined in other ways without departing from the description. For example, the user's search history is used to determine that the user never or rarely uses a particular search term that would be of use in the current search, so the suggested query prompt includes information describing the particular search term, how to use it, and why it would be useful in the current search. Alternatively, or additionally, the user's historical search data and other context data is used to determine a level of search sophistication or expertise of the user and to cater any suggested search changes to that level, so as not to overwhelm the user with complicated search terms or associated operations.

Exemplary Operating Environment

Figure 4:
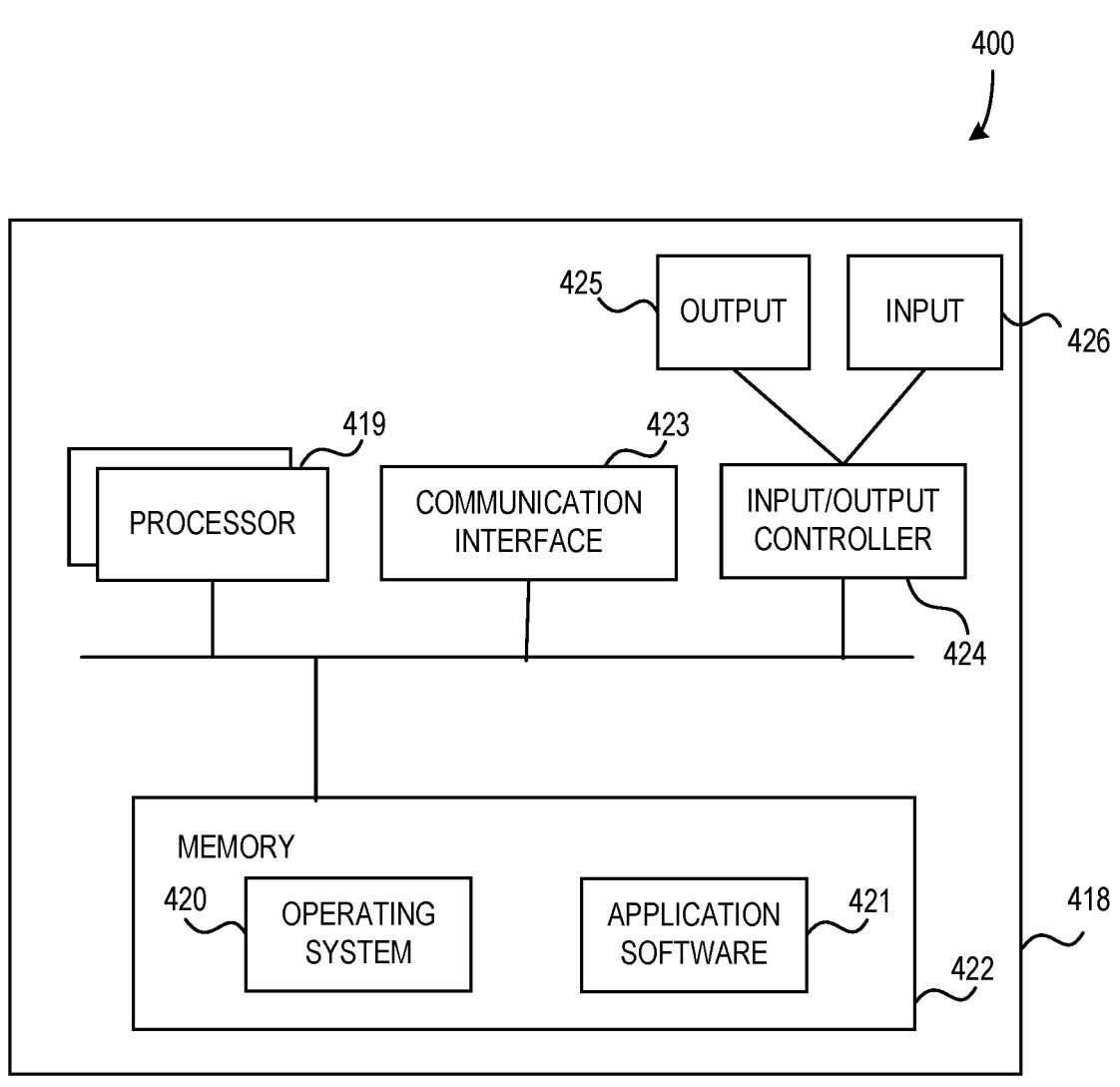
FIG. 4 illustrates an example computing apparatus as a functional block diagram.

The present disclosure is operable with a computing apparatus according to an embodiment as a functional block diagram 400 in FIG. 4. In an example, components of a computing apparatus 418 are implemented as a part of an electronic device according to one or more embodiments described in this specification. The computing apparatus 418 comprises one or more processors 419 which may be microprocessors, controllers, or any other suitable type of processors for processing computer executable instructions to control the operation of the electronic device. Alternatively, or in addition, the processor 419 is any technology capable of executing logic or instructions, such as a hard-coded machine. In some examples, platform software comprising an operating system 420 or any other suitable platform software is provided on the apparatus 418 to enable application software 421 to be executed on the device.

In some examples, computer executable instructions are provided using any computer-readable media that is accessible by the computing apparatus 418. Computer-readable media include, for example, computer storage media such as a memory 422 and communications media. Computer storage media, such as a memory 422, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 422) is shown within the computing apparatus 418, it will be appreciated by a person skilled in the art, that, in some examples, the storage is distributed or located remotely and accessed via a network or other communication link (e.g., using a communication interface 423).

Further, in some examples, the computing apparatus 418 comprises an input/output controller 424 configured to output information to one or more output devices 425, for example a display or a speaker, which are separate from or integral to the electronic device. Additionally, or alternatively, the input/output controller 424 is configured to receive and process an input from one or more input devices 426, for example, a keyboard, a microphone, or a touchpad. In one example, the output device 425 also acts as the input device. An example of such a device is a touch sensitive display. The input/output controller 424 may also output data to devices other than the output device, e.g., a locally connected printing device. In some examples, a user provides input to the input device(s) 426 and/or receives output from the output device(s) 425.

The functionality described herein can be performed, at least in part, by one or more hardware logic components. According to an embodiment, the computing apparatus 418 is configured by the program code when executed by the processor 419 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUS).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a memory comprising computer-executable instructions that, when executed by the processor, cause the processor to perform the following operations: receiving a query from a user; based on the query, selecting a website; identifying a plurality of media on the website; based at least on the query, selecting a portion of the plurality of media on the website; extracting content from each piece of media from the selected portion of the plurality of media based on the query; generating semantic summaries of the extracted content; aggregating the semantic summaries; and providing the aggregated semantic summaries to the user.

An example computerized method comprises: receiving a query from a user; based on the query, selecting a website; identifying a plurality of media on the website; based at least on the query, selecting a portion of the plurality of media on the website; extracting content from each piece of media from the selected portion of the plurality of media based on the query; generating semantic summaries of the extracted content; aggregating the semantic summaries; and providing the aggregated semantic summaries to the user.

One or more computer storage media having computer-executable instructions that, upon execution by a processor, cause the processor to at least; receive a query from a user; based on the query, select a website; identify a plurality of media on the website; based at least on the query, select a portion of the plurality of media on the website; extract content from each piece of media from the selected portion of the plurality of media based on the query; generate semantic summaries of the extracted content; aggregate the semantic summaries; and provide the aggregated semantic summaries to the user.

Alternatively, or in addition to the other examples described herein, examples include any combination of the following:

wherein the plurality of media comprises a plurality of different media types.

wherein identifying the plurality of media on the website comprises detecting a markup layout pattern for each of the plurality of media.

wherein selecting the portion of the plurality of media on the website comprises selecting the portion of the plurality of media that is most relevant to the query.

wherein the processor is further programmed to perform the following operations; determining the most relevant media by: performing natural language processing (NLP) semantic evaluation against each block of media, wherein each block comprises the media and surrounding text; extracting a fragment of content from each block; comparing the fragment of content to the query; and based at least on the comparing, determining the most relevant media.

wherein the aggregated semantic summaries comprise succinct sentences that do not exceed a threshold number of sentences or words.

wherein the processor is further programmed to use natural language processing (NLP) to determine an inference from the query; and using the determined inference to: select the website; select the portion of the plurality of media on the website; and extract content from each piece of media from the selected portion of the plurality of media.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for based on the query, selecting a website; exemplary means for identifying a plurality of media on the website; exemplary means for based at least on the query, selecting a portion of the plurality of media on the website; exemplary means for extracting content from each of the selected portion of the plurality of media based on the query; exemplary means for generating semantic summaries of the extracted content; exemplary means for aggregating the semantic summaries into an aggregated semantic summary; and exemplary means for providing the aggregated semantic summary to the user.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer-executable instructions that, when executed by the processor, cause the processor to perform the following operations:
receiving a query from a user;
based on the query, selecting a website;
identifying a plurality of media on the website;
detecting a markup layout pattern for each of the plurality of media;
identifying a plurality of blocks of media based on the detected markup layout patterns, wherein each of the plurality of blocks of media comprise at least a portion of the plurality of media and surrounding text;
performing natural language processing (NLP) semantic evaluation for each of the plurality of blocks of media;
based on the performing, extracting data from a respective block of media from the plurality of blocks of media;
comparing the extracted data to the query;
based at least on the comparing, determining a degree of relevance of each of the plurality of media;
based at least on the degree of relevance, selecting a portion of the plurality of media on the website comprising the markup layout pattern;
extracting content from each of the selected portion of the plurality of media;
generating semantic summaries of the extracted content;
aggregating the semantic summaries into an aggregated semantic summary; and
providing the aggregated semantic summary to the user.

2. The system of claim 1, wherein the plurality of media comprises a plurality of different media types.

3. The system of claim 2, wherein identifying the plurality of media on the website comprises detecting a markup layout pattern for each of the plurality of media.

4. The system of claim 3, wherein selecting the portion of the plurality of media on the website comprises selecting the portion of the plurality of media based on the degree of relevance to the query.

5. The system of claim 4, wherein
extracting data from the respective block of media from the plurality of blocks of media comprises extracting a fragment of content from the respective block of media; and
wherein comparing the extracted data to the query comprises comparing the fragment of content to the query.

6. The system of claim 5, wherein the aggregated semantic summary comprises a threshold number of succinct sentences that do not exceed a threshold number of words.

7. The system of claim 1, wherein the processor is further programmed to use natural language processing (NLP) to determine an inference from the query; and using the determined inference to:
select the website;
select the portion of the plurality of media on the website; and
extract content from each of the selected portion of the plurality of media.

8. A computerized method comprising:
receiving a query from a user;
based on the query, selecting a website;
identifying a plurality of media on the website;
detecting a markup layout pattern for each of the plurality of media;
identifying a plurality of blocks of media based on the detected markup layout patterns, wherein each of the plurality of blocks of media comprise at least a portion of the plurality of media and surrounding text;
performing natural language processing (NLP) semantic evaluation for each of the plurality of blocks of media;
based on the performing, extracting data from a respective block of media from the plurality of blocks of media;
comparing the extracted data to the query;
based at least on the comparing, determining a degree of relevance of each of the plurality of media;
based at least on the degree of relevance, selecting a portion of the plurality of media on the website comprising the markup layout pattern;

extracting content from each of the selected portion of the plurality of;

generating semantic summaries of the extracted content;

aggregating the semantic summaries into an aggregated semantic summary; and providing the aggregated semantic summary to the user.

9. The computerized method of claim 8, wherein the plurality of media comprises a plurality of different media types.

10. The computerized method of claim 8, wherein identifying the plurality of media on the website comprises detecting a markup layout pattern for each of the plurality of media.

11. The computerized method of claim 8, wherein selecting the portion of the plurality of media on the website comprises selecting the portion of the plurality of media based on a degree of relevance to the query.

12. The computerized method of claim 11, wherein extracting data from the respective block of media from the plurality of blocks of media comprises extracting a fragment of content from the respective block of media; and wherein comparing the extracted data to the query comprises comparing the fragment of content to the query.

13. The computerized method of claim 8, wherein the aggregated semantic summary comprises a threshold number of succinct sentences that do not exceed a threshold number of words.

14. The computerized method of claim 8, further comprising using natural language processing (NLP) to determine an inference from the query; and using the determined inference to:

select the website;

select the portion of the plurality of media on the website; and extract content from each of the selected portion of the plurality of media.

15. A computer storage medium storing computer-executable instructions that, upon execution by a processor, cause the processor to at least:

receive a query from a user;

based on the query, select a website;

identify a plurality of media on the website;

detecting a markup layout pattern for each of the plurality of media;

identifying a plurality of blocks of media based on the detected markup layout patterns, wherein each of the plurality of blocks of media comprise at least a portion of the plurality of media and surrounding text:

performing natural language processing (NLP) semantic evaluation for each of the plurality of blocks of media;

based on the performing, extracting data from a respective block of media from the plurality of blocks of media;

comparing the extracted data to the query;

based at least on the comparing, determining a degree of relevance of each of the plurality of media;

based at least on the degree of relevance, select a portion of the plurality of media on the website comprising the markup layout pattern;

extract content from each of the selected portion of the plurality of media;

generate semantic summaries of the extracted content;

aggregate the semantic summaries into an aggregated semantic summary; and provide the aggregated semantic summary to the user.

16. The computer storage medium of claim 15, wherein the plurality of media comprises a plurality of different media types.

17. The computer storage medium of claim 15, wherein identifying the plurality of media on the website comprises detecting a markup layout pattern for each of the plurality of media.

18. The computer storage medium of claim 15, wherein selecting the portion of the plurality of media on the website comprises selecting the portion of the plurality of media based on a degree of relevance to the query.

19. The computer storage medium of claim 18, wherein extracting data from the respective block of media from the plurality of blocks of media comprises extracting a fragment of content from the respective block of media; and wherein comparing the extracted data to the query comprises comparing the fragment of content to the query.

20. The computer storage medium of claim 15, wherein the computer-executable instructions, upon execution by the processor, further cause the processor to use natural language processing (NLP) to determine an inference from the query; and using the determined inference to:

select the website;

select the portion of the plurality of media on the website; and extract content from each of the selected portion of the plurality of media.

* * * * *